Figure 1:
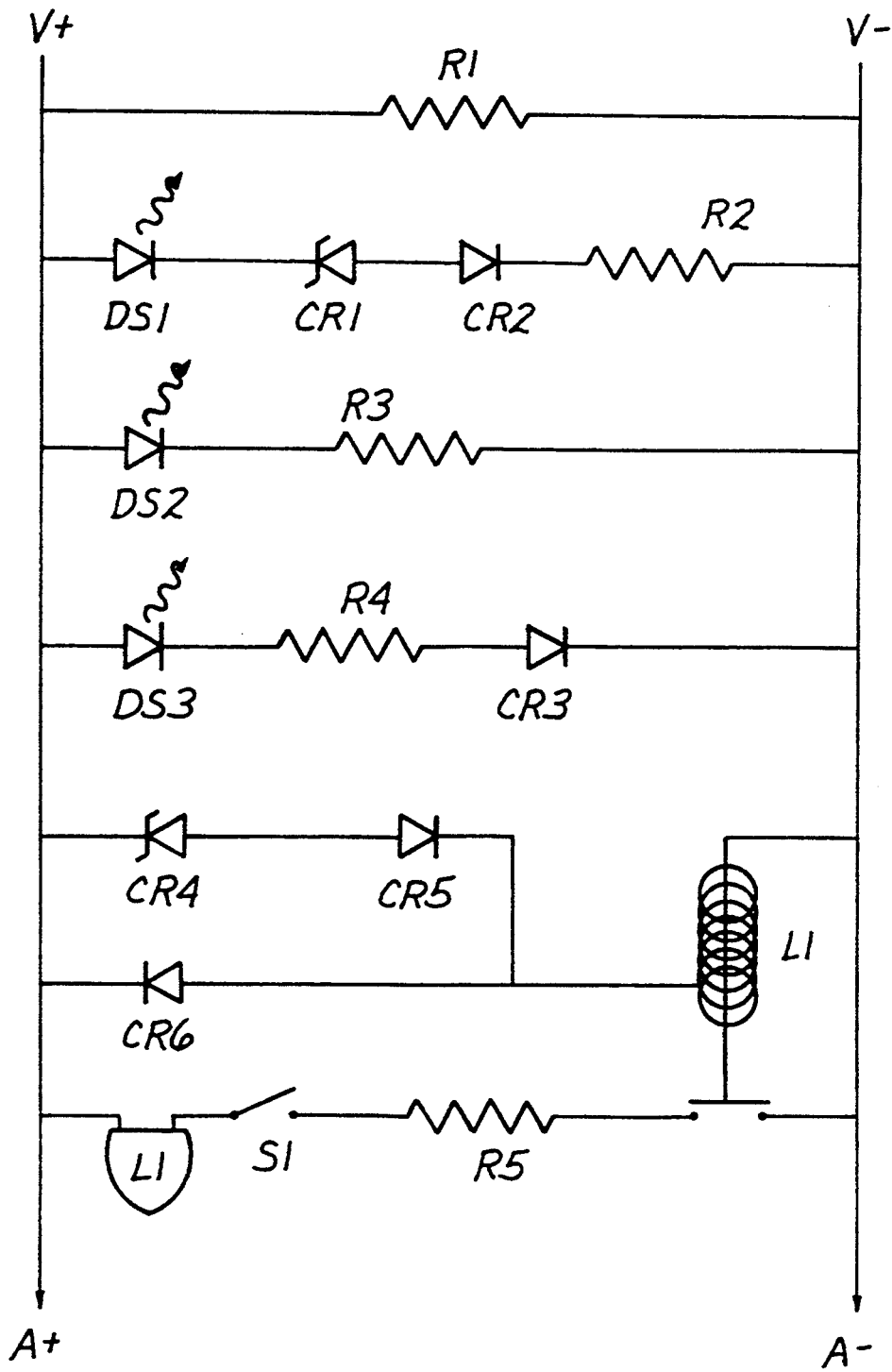

United States Patent
Kendrick

[11] Patent Number: 5,334,925
[45] Date of Patent: Aug. 2, 1994

[54] NICKEL CADMIUM BATTERY DEEP CYCLER DEVICE

[76] Inventor: Robert A. Kendrick, P.O. Box 1576, Fallbrook, Calif. 92028

[21] Appl. No.: 946,680

[22] Filed: Sep. 18, 1992

[51] Int. Cl.⁵ .................................................. H02J 7/00
[52] U.S. Cl. .............................................. 320/5; 320/13; 320/14
[58] Field of Search .................... 320/5, 6, 13, 14, 48, 320/39, 40

[56] References Cited

U.S. PATENT DOCUMENTS

| | | | |
|---|---|---|---|
| 3,648,145 | 3/1972 | Meyer et al. | 320/13 |
| 3,803,475 | 4/1974 | Anichini | 320/13 |
| 3,915,670 | 8/1976 | McDermott | 320/13 |
| 4,081,743 | 3/1978 | Madden | 320/13 X |
| 4,302,714 | 11/1981 | Yefsky | 320/5 |
| 4,609,860 | 9/1986 | Fasen | 320/14 |
| 4,734,635 | 3/1988 | Theobald | 320/13 |
| 4,758,772 | 7/1988 | Lang | 320/13 X |
| 4,829,225 | 5/1989 | Podrazhansky et al. | 320/14 |
| 4,878,007 | 10/1989 | Gábor et al. | 320/14 |
| 5,107,196 | 8/1990 | Agreste, Jr. et al. | 320/13 |
| 5,138,246 | 8/1992 | Kobayashi | 320/13 |
| 5,159,258 | 10/1992 | Kolvites et al. | 320/14 |
| 5,164,653 | 11/1992 | Reem | 320/13 |
| 5,177,426 | 1/1993 | Nakanishi et al. | 320/13 |
| 5,196,779 | 3/1993 | Alexandres et al. | 320/14 |

*Primary Examiner*—Kristine L. Peckman
*Attorney, Agent, or Firm*—Loyal M. Hanson

[57] ABSTRACT

A device for draining a nickel cadmium or other battery prior to recharging the battery includes first and second input terminals for connecting the device to a battery to be discharged, and first and second circuits coupled to the input terminals for draining current from the battery for deep cycle discharge purposes. The first circuit has sufficient resistance to drain current from the battery without damage to the battery when the battery has an output voltage above a predetermined threshold level (e.g., 3.3 volts), and the second circuit presents a low resistance in order to drain current from the battery when the battery has an output voltage no greater than the threshold level. The device includes a relay coupled to the input terminals for decoupling the second circuit from the battery when the battery has an output voltage greater than the threshold level. In one embodiment, the second circuit includes circuitry in the form of an incandescent lamp in series with a resistor for presenting a resistance between the first and second input terminals that decreases to approximately one ohm as the output voltage of the battery decreases. The device requires no power source apart from the battery to be discharged and it may include one or more LEDs indicating the level of the output voltage of the battery as well as first and second meter terminals for enabling a user to connect an external voltmeter to the device for purposes of monitoring the output voltage of the battery.

7 Claims, 1 Drawing Sheet

NICKEL CADMIUM BATTERY DEEP CYCLER DEVICE

BACKGROUND

1. Field of the Invention

The present invention relates to an independent device for draining the power from Nickel Cadmium batteries so they may be recharged to a useful condition. The "deep cycler" is designed to drain batteries of 15 volts or less and thus prevent or eliminate the "memory set" that eventually occurs in most rechargeable nickel cadmium batteries.

The device is designed to be clipped onto a battery for purposes of draining current from the battery prior to recharging the battery. It uses two circuits. They are separately actuated by a relay according to the voltage level of the battery. The first circuit provides an initial high-voltage current drain that is greater than the current drain of the second circuit, and it includes a voltage monitoring circuit that uses LEDs biased at different voltages. The second circuit provides a final current drain after the initial current drain of the first circuit, and it uses an incandescent lamp to indicate discharge until the battery voltage drops to 0.7 volts. A voltmeter may be inserted into V+ and V− voltmeter receptacles for further monitoring of the battery voltage.

2. Description of Prior Art

Existing technology for draining power from Nickel Cadmium batteries has been limited to voltage specific drains, for example a 9 volt discharger. This device is unique in that it is designed to discharge or "deep cycle" any battery with a voltage level below 15 volts.

U.S. Pat. No. 4,829,225, Rapid Battery Charger, Discharger and Conditioner is intended to condition and charge batteries of only a specific voltage and requires an external power source.

U.S. Pat. Nos. 4,829,007 and 4,829,225 use a method of "pulsing" Nickel Cadmium batteries to discharge a specific level voltage. Again these devices are limited to one voltage and require external power. They also incorporate a charging device and are thus more restrictive in use to one specific designed battery.

U.S. Pat. No. 5,107,196, "Battery Bug" is similar to the applicants device in that it does not use external power and is designed only to drain a battery and uses LEDs as voltage indicators. However, there are several major differences in the design and effectiveness of this unit. They include:

1. The "Battery Bugs" two circuits do not appear to be separated, but are instead installed in constant parallel to each other. This design allows a battery to drain too quickly at high voltages and too slowly at low voltage. Too fast drain can damage the battery cells.
2. The use of LEDs for monitoring is good only to approximately 1.5 volts, below that value the LEDs do not illuminate.

The applicant's device uses LED circuits biased at specific voltages above 3.3 volts, and an incandescent lamp of specific value to indicate voltage discharge to 0.7 volts. In addition the applicant's device varies the circuit resistance from 3.3 ohms to a 1 ohm "cold" final resistance. This 1 ohm circuit is the desired design resistance for deep cycling NiCad batteries.

In addition, the applicant's device permits the battery to be relieved of its load by opening S1, thus allowing any residual battery energy to be indicated through the LED, thus showing the battery in not fully deep cycled.

DESCRIPTION OF THE PRESENT INVENTION

The "Improved Nickel Cadmium battery deep cycler" is a self-contained system providing the user with the ability to discharge any battery with any level of voltage up to 15 volts.

In reference to FIG. 1, the device is attached to the anode and cathode of a battery at input terminals A+ and A− respectively.

If the voltage is over 4 volts, the current passes through CR4, Zener, Cr5 silicon diode and the 70 ohm coil of relay I1. When this occurs, I1 relay changes from its normally closed position to an open position, this interrupts current through L1 lamp, S1 SPST switch and R5 power resistor.

At this point, CR6 silicon diode is connected in parallel with CR4 Zener, and CR5 silicon diode, and in series with the I1 coil to open the 11 lamp circuit in the event the leads are connected with polarity reversed to the battery. This prevents L1 lamp from burning out under too high a voltage.

When connected properly to a battery of 15 volts or less, the device will safely drain the battery though the R1 12.5 ohm power resistor, at a rate that will not damage the battery.

The voltage drops are monitored through circuit DS1 LED, CR1 Zener and R2 resistor. This circuit will illuminate LED DS1 above 7 volts.

Voltage drops are further monitored to 3.3 volts through circuit DS3 high intensity LED, CR3 diode and R4 power resistor.

Circuit DS2 blinking LED and R3 resistor are used as a "system working" indicator circuit and are used to pulse the entire system to assist the relay in closing when the desired voltage level (approximately 3.3) is reached.

When the battery drains to approximately 3.3 volts, current through CR4 Zener, CR5 diode and the 70 ohm coil is interrupted, I1 relay returns to its normally closed position. This closure completes circuit L1 lamp, S1 switch and R5 resistor and the relay contact points. At this voltage the circuit offers about 3.3 ohms resistance. As the battery power is drained, resistance through L1 lamp drops evenly to a cold resistance of approximately 0.6 ohms giving this circuit a final one (1) ohm design. ( R5=0.47 ohms)

When L1 lamp is out, S1 switch can be used to disconnect circuit L1,S1 and R5 from the battery. This will cause residual energy in the battery to illuminate DS3 high intensity LED and or DS2 blinking LED thus indicating that the battery is not fully deep cycled. If none of the LEDs are illuminated, the battery is completely discharged and can be disconnected for recharging. Voltage monitoring at this point is done with a volt meter inserted at meter terminals V+ and V−.

The following TABLE A sets forth an example of some suitable component values for the circuit in FIG. 1. Of course, the circuit may be modified and other components and component values may be substituted without departing from the broader inventive concepts claimed.

TABLE A

| | |
|---|---|
| R1 | 12.4 ohm, 30 watt, power resistor |
| R2 | 100 ohm, ½ watt resistor |
| R3 | 47 ohm, 1.2 watt resistor |

TABLE A-continued

| R4 | 67 ohm, 1.2 watt resistor |
|---|---|
| R5 | .47 ohm, power resistor |
| DS1 | Amber LED |
| DS2 | Blinking LED |
| DS3 | High intensity LED |
| CR1 | 5.1 volt, 1 watt, Zener |
| CR2 | .7 silicon diode |
| CR3 | .7 silicon, diode |
| CR4 | 2.4 volt Zener |
| CR5 | .7 volt silicon diode |
| CR6 | .7 volt silicon diode |
| L1 | 3.6 V, 800 mA lamp with socket |
| S1 | SPST switch |
| I1 | Relay, 2 A, 5 V coil at 70 ohms |

I claim:

1. A device for draining a battery prior to recharging the battery, the device comprising:
   means in the form of first and second input terminals for connecting the device to a battery to be discharged;
   means in the form of a first circuit coupled to the input terminals for draining current from the battery connected to the input terminals, the first circuit having sufficient resistance to drain current from the battery without damage to the battery when the battery has an output voltage above a predetermined threshold level;
   means in the form of a second circuit coupled to the input terminals for draining current from the battery when the battery has an output voltage no greater than the threshold level; and
   means in the form of a relay coupled to the input terminals for decoupling the second circuit from at least one of the first and second input terminals when the battery has an output voltage greater than the threshold level;
   wherein the second circuit includes means in the form of an incandescent lamp in series with a resistor for presenting a resistance between the first and second input terminals that decreases to approximately one ohm as the output voltage of the battery decreases.

2. A device for draining a battery prior to recharging the battery, the device comprising:
   means in the form of first and second input terminals for connecting the device to a battery to be discharged;
   means in the form of a first circuit coupled to the input terminals for draining current from the battery connected to the input terminals, the first circuit having sufficient resistance to drain current from the battery without damage to the battery when the battery has an output voltage above a predetermined threshold level;
   means in the form of a second circuit coupled to the input terminals for draining current from the battery when the battery has an output voltage no greater than the threshold level; and
   means in the form of a relay coupled to the input terminals for decoupling the second circuit from at least one of the first and second input terminals when the battery has an output voltage greater than the threshold level;
   wherein the threshold voltage is approximately 3.3 volts.

3. A device for draining a battery prior to recharging the battery, the device comprising:
   means in the form of first and second input terminals for connecting the device to a battery to be discharged;
   means in the form of a first circuit coupled to the input terminals for draining current from the battery connected to the input terminals, the first circuit having sufficient resistance to drain current from the battery without damage to the battery when the battery has an output voltage above a predetermined threshold level;
   means in the form of a second circuit coupled to the input terminals for draining current from the battery when the battery has an output voltage no greater than the threshold level; and
   means in the form of a relay coupled to the input terminals for decoupling the second circuit from at least one of the first and second input terminals when the battery has an output voltage greater than the threshold level;
   wherein the device requires no power source apart from the battery to be discharged.

4. A device as recited in claim 3, wherein at least one of the first and second circuits includes an LED for indicating the level of the output voltage of the battery.

5. A device as recited in claim 3, wherein the first circuit has a power handling capability sufficient to discharge current when the battery has an output voltage of at least 15 volts.

6. A device as recited in claim 3, further comprising means in the form of first and second meter terminals for enabling a user to connect an external voltmeter to the device for purposes of monitoring the output voltage of the battery.

7. A device for draining a battery prior to recharging the battery, the device comprising:
   means in the form of first and second input terminals for connecting the device to a battery to be discharged;
   means in the form of a first circuit coupled to the input terminals for draining current from the battery connected to the input terminals, the first circuit having sufficient resistance to drain current from the battery without damage to the battery when the battery has an output voltage above a predetermined threshold level;
   means in the form of a second circuit coupled to the input terminals for draining current from the battery when the battery has an output voltage no greater than the threshold level; and
   means in the form of a relay coupled to the input terminals for decoupling the second circuit from at least one of the first and second input terminals when the battery has an output voltage greater than the threshold level;
   wherein the second circuit includes means in the form of an incandescent lamp in series with resistor for presenting a resistance between the first and second input terminals that decreases to approximately one ohm as the output voltage of the battery decreases;
   wherein the threshold level is approximately 3.3 volts; and
   wherein the device requires no power source apart from the battery to be discharged.

* * * * *